3,294,785
NOVEL PROCESS FOR THE CONVERSION OF A SAPOGENIN TO A 16-DEHYDRO STEROID AND INTERMEDIATES PRODUCED THEREBY
Masato Tanabe, Palo Alto, Calif., assignor to Schering Corporation, Bloomfield, N.J., a corporation of New Jersey
No Drawing. Filed May 25, 1966, Ser. No. 552,681
25 Claims. (Cl. 260—239.55)

This application is a continuation-in-part of the co-pending applications of Masato Tanabe, Serial Nos. 298,433 and 472,323, filed July 29, 1963, and July 15, 1965, respectively, both now abandoned.

This invention relates to a novel process for the conversion of sapogenins to 16-dehydro steroids and to novel intermediates produced thereby.

More particularly, this invention relates to a novel process for the conversion of sapogenins to ring opened sapogenin derivatives which, in turn, are convertible via oxidative techniques to 16-dehydro-20-keto steroids of the pregnane series.

Specifically, this invention relates to the process of treating a sapogenin with a formamidinium salt, e.g., cloromethylene dimethylammonium chloride (dimethylformamido chloride) whereby are produced a 27-chloro-20(22)-furostene and 23-formyl-27-chloro-22-furostene derivatives, each of which either separately or together, upon treatment with base and oxidation, followed by beta-elimination via acid or base of the thereby formed 16β-hydroxy ethers, is converted to a 16-dehydro-20-keto steroid of the pregnane series.

The process of this invention is shown below in Chart I with Z representing the A, B, and C rings of the cyclopentanophenanthrene nucleus of a sapogenin, the formamidinium salts of structure IX being defined in detail hereinbelow.

CHART I

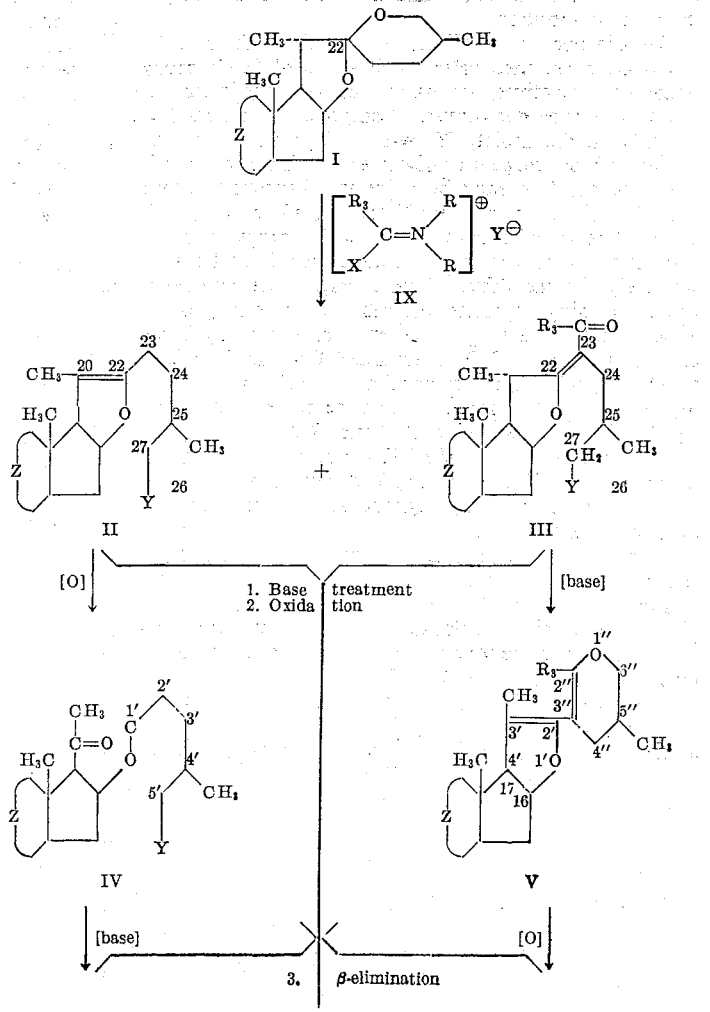

CHART I—Continued

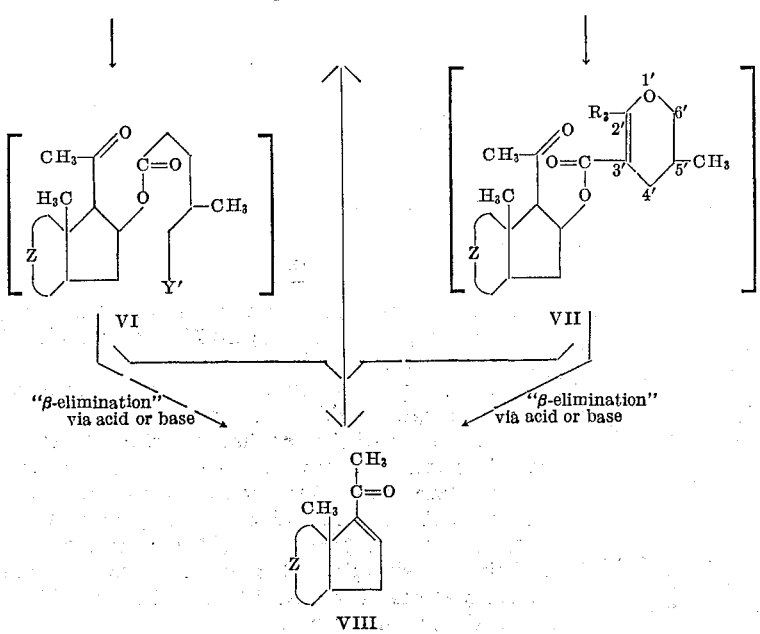

In Chart I there is indicated the numbering used in this application for naming the novel intermediates of structures II, III, IV, V, VI and VII.

The compounds of structures II and III are named as furostene derivatives according to standard nomenclature practice. Unless otherwise indicated, the hydrogen at C–5 in a furostene compound is considered as being in the beta ($\beta$)-position.

The diosone intermediates of structures IV and VI, which are substituted valeric acid esters of 16$\beta$-hydroxypregnane derivatives, are named as 16-(substituted valeroxy)-pregnane derivatives. Compound VI differs from IV only in the moiety Y, which, depending upon the choice of basic reagent as discussed hereinbelow, may be the same as Y or may be a lower alkanoyloxy group.

Intermediates of structure V are named as 16,17(4,5)'-dihydrofurano-androstanes having a dihydropyranyl substituent and a methyl group at the 2' and 3' carbons, respectively, of the dihydrofurane ring. The numbering within the dihydropyrane and dihydrofurane ring is patterned after standard practice such as shown by Fieser and Fieser on page 310 in Advanced Organic Chemistry, Reinhold Publishing Corporation (1961), wherein the oxygen atom is numbered "1" and the carbon atoms having the double bond being C–2 and C–3.

Intermediates of structure VII are named as substituted carboxylic acid esters of 16$\beta$-hydroxypregnane derivatives, i.e. as 16$\beta$-hydroxypregnane 16-(5'-methyldihydropyranyl-3'-carboxylates).

Thus, from diosgenin acetate and hecogenin acetate (sapogenins of structure I) upon reaction with a formamidinium salt wherein Y is chlorine, e.g. chloromethylene dimethylammonium chloride (i.e. dimethylformamido chloride), the corresponding derivatives of structure II are identified as 3$\beta$-acetoxy-27-chloro-5,20(22)-furostadiene and 3$\beta$-acetoxy-12-keto-27-chloro-20(22)-furostene, respectively; the corresponding derivatives of Formula III, as 3$\beta$-acetoxy-23-formyl-27-chloro-5,22-furostadiene and 3$\beta$-acetoxy-12-keto-23-formyl-27-chloro-22-furostene, respectively; the corresponding derivatives of Formulas IV and VI, as 3$\beta$-acetoxy-16$\beta$-(5'-chloro-4'-methyl-valeroxy)-5-pregnene 20-one and 3$\beta$-acetoxy-16$\beta$-(5'-chloro-4'-methyl-valeroxy)-5$\alpha$-pregnane-12,20-dione, respectively; the corersponding derivatives of Formula V, as 3$\beta$-acetoxy - 16,17(4',5') - [3' - methyl - 2' - [3'' - (5'' - methyldihydropyranyl)]-dihydrofurano]-5-androstene- and 3$\beta$-acetoxy - 12 - keto - 16,17(4',5') - [3' - methyl - 2' - [3''-(5'' - methyldihydropyranyl)] - dihydrofurano] - androstane, respectively; and the corresponding derivatives of Formula VII as 3$\beta$-acetoxy-16$\beta$-hydroxy-5-pregnene-20-one 16-(5'-methyldihydropyranyl-3'-carboxylate) and 3$\beta$-acetoxy - 16$\beta$ - hydroxy - 5$\alpha$ - pregnane - 12,20 - dione 16-(5'-methyldihydropyranyl-3'-carboxylate), respectively.

The starting compounds of my novel process may be any natural sapogenin such as sarsapogenin, smilagenin, neotigogenin, tigogenin, neohecogenin, rockogenin, yamogenin, diosgenin, neobotogenin, botogenin, and the like, as well as synthetic sapogenins such as 11-keto-tigogenin, 11-keto-botogenin, and the like, such as listed in table 21.8 on page 831 of Steroids, Fieser and Fieser, Reinhold Publishing Corporation, New York (1959).

For use in the process of this invention, any reactive hydroxyl groups present in the starting sapogenin, such as at C–3, are preferably protected, such as by an ester or ether group, prior to reaction with the formamidinium salt IX. It is usually convenient to convert the sapogenins into the lower alkanoate esters thereof, e.g. diosgenin acetate, hecogenin acetate, and yamogenin acetate, and the like.

The formamidinium salts and derivaties thereof preferably used for conversion of a sapogenin to a mixture of ring opened sapogenin derivatives II and III according to the novel process of this invention as outline in Chart I may be depicted by the following structural Formula IX:

$$\begin{bmatrix} R_3 & R \\ \diagdown & \diagup \\ & C=N \\ \diagup & \diagdown \\ X & R \end{bmatrix}^{\oplus} Y^{\ominus}$$

IX wherein R is a member of the group consisting of alkyl, aryl, and aralkyl; $R_3$ is a member of the group consisting of hydrogen, alkyl, aryl, and aralkyl; X is a member selected from the group consisting of halogeno, dichlorophosphoryloxy (—OPOCl$_2$), bisulfato (also may be called hydroxy-sulfonyloxy) (—OSO$_3$H), p-toluene-sulfonyloxy

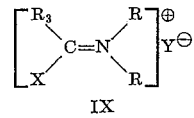

chlorosulfonyl (—OSOCl), and the like; and Y is a member selected from the group consisting of halide (preferably having an atomic weight greater than 20), dichlorophosphoryloxide (OPOC$_2^\ominus$), bisulfate (OSO$_3$H$^\ominus$), tosylate

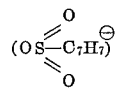

antimonylhexachloride (SbCl$_6^\ominus$), and the like; wherein at least one of X and Y is halogeno.

In Formula IX by "alkyl" are contemplated lower alkyl straight chain and branched radicals having preferably up to 6 carbon atoms, such as methyl, ethyl, isopropyl, butyl, hexyl; by "aryl" are contemplated radicals such as phenyl, tolyl, and the like; and by "aralkyl" are contemplated radicals exemplified by benzyl and methyl-benzyl.

The formamidinium salts shown in above Formula IX in ionic form, are also named as the covalent amine (IX') shown below

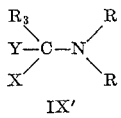

IX'

Thus, a compound wherein R is methyl, R$_3$ is hydrogen, and X and Y are chloro may be named chloromethylene dimethylammonium chloride (or dimethylformamido chloride) to depict the ionic structure IX, or as 1,1-dichloro-trimethylamine to depict the covalent amine structure IX'.

Under the reaction conditions of the process of this invention, the formamidinium salt reagent exists in ionic form (IX). Formamidinium salts wherein X and Y are different, e.g., 1-chloro-1-dichlorophosphoryloxy-trimethylamine (Formula IX') wherein R is methyl, R$_3$ is hydrogen, X is dichlorophosphoryloxy, and Y is chloro, have two possible ionic structures, e.g. chloromethylene dimethylammonium dichlorophosphoryloxide (structure IX wherein X is chloro and Y is dichlorophosphoryloxide) and dichlorophosphoryloxymethylene dimethylammonium chloride (structure IX wherein X is dichlorophosphoryloxy and Y is chloride). This may be depicted graphically as follows:

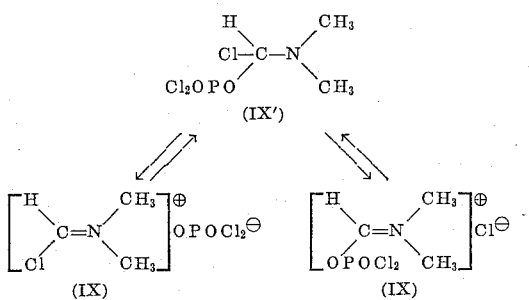

In my novel process, whatever ionic form of the formamidinium salt may be present in situ, there is effected the conversion of a sapogenin to a 16-dehydro-pregnane compound. Additionally, when either of X and Y is halogen, there will be formed predominantly furostene intermediates II and III wherein Y is halogen. Thus, when diosgenin acetate and hecogenin acetate are each reacted with the reagent 1-chloro-1-dichlorophosphoryloxy trimethylamine described above (prepared by reaction of phosphorous oxychloride with dimethylformamide) the predominant form of furostene intermediates II and III obtained are those wherein Y is chloride, and which are identical with the respective intermediates (as disclosed hereinabove with reference to Chart I) obtained with the reagent 1,1-dichloro trimethylamine (chloromethylene dimethylammonium chloride) prepared by reaction of phosgene with dimethylformamide.

In general, in this application, when naming a formamidium salt, the ionic structure name will be given, and, in those compounds wherein X and Y are different, the name preferred will be that wherein Y is halogen, it being understood that the other ionic form as well as the covalent structure is inherently included.

I prefer to use as formamidinium salt reagent chloromethylene dimethylammonium chloride (dimethylformaamido chloride) a compound of general Formula IX wherein R is methyl, R$_3$ is hydrogen, X and Y are chlorine, i.e. the compound:

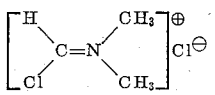

Throughout this application when discussing my novel process, chloromethylene dimethylammonium chloride (dimethylformamido chloride) will be named to exemplify a formamidinium salt, it being understood that other salts defined by Formula VII are considered as equivalents, e.g., formamidinium salts such as chloromethylene N-methyl-N-phenylammonium chloride (N-methyl-N-phenylformamido chloride), 1-phenyl-1-chloromethylene dimethylammonium chloride (dimethylbenzamido chloride), dichlorophosphoryloxymethylene dimethylammonium chloride, bromomethylene dimethylammonium bromide, iodomethylene dimethylammonium iodide, chloromethylene dimethylammonium hexachloroantimonate, p-toluenesulfonyloxymethylene dimethylammonium chloride, bisulfatomethylene dimethylammonium chloride and the like.

The formamidinium salts are prepared according to procedures well known in the art such as those described by Dr. H. Kuhle, Angew. Chemie, 1 (International Edition), 647 (1962); M. R. de Maheas, Bull. Soc. Chim. Fr., 1989 (1962); H. Eilingsfeld et al., Angew. Chemie, 1 (International Edition) (1960); Z. Arnold, Collect. Czech. Chem. Comm., 27, 2993 (1962); Z. Arnold and H. Holy, ibid., 27, 2886 (1962), and 26, 3059 (1961); Z. Arnold and J. Zenlicka, ibid., 24, 786 (1959); H. H. Bossard and Hch. Zollinger, Helv. Chim. Acta., 42, 1659 (1959); and H. H. Bossard et al., Helv. Chim. Acta., 42, 1652 and 1963 (1959).

Formamidinium salts such as those preferably used in my process (i.e. those of Formula IX wherein at least one of X and Y is halogen) may generally be prepared by reacting an N,N-disubstituted amide (such as dimethylformamide, dimethylacetamide, N-methyl-N-phenylformamide and the like) with an acid halide of an organic acid (for example phosgene, oxalyl chloride, p-toluene sulfonyl chloride) or with an inorganic acid halide (e.g. antimony tetrachloride, phosphorous tribromide, phosphorous trichloride, phosphorous pentachloride, phosphorous oxychloride, thionyl chloride, chlorosulfonic aicd (ClSO$_3$H) and the like).

Chloromethylene dimethylammonium chloride (dimethylformamido chloride) is conveniently prepared by introducing phosgene, oxalylchloride or thionyl chloride into cooled dimethylformamide, preferably at 0° C., with or without the use of a non-reactive solvent, e.g., halogenated hydrocarbons such as methylene chloride, chloroform, and the like.

When thionylchloride or oxalylchloride is used, there is first formed, in situ, an ionic form of 1-chloro-1-chlorosulfonyl-trimethylamine

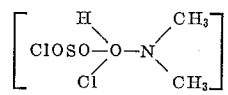

which stabilizes with loss of sulfur dioxide to form chloromethylene dimethylammonium chloride.

In carrying out my novel process, I find it convenient to first prepare the dimethylformamido chloride reagent by introducing phosgene into cooled dimethylformamide and, when the white precipitate of chloromethylene dimethylammonium chloride (i.e. dimethylformamido chloride) has set to a solid mass, add the sapogenin starting compound, e.g., diosgenin acetate and hecogenin acetate.

Alternatively, one can prepare the formamidinium salt in situ in the presence of the sapogenin starting compound. Thus, for example, to a cooled solution of diosgenin acetate in methylene chloride containing dimethylformamide, there may be introduced phosgene or an equimolar amount of thionylchloride relative to the molar quantity of dimethylformamide.

In the conversion of a sapogenin I to a mixture of ring opened sapogenin derivatives II and III, a large molar excess of formamidinium salt, e.g. chloromethylene dimethylammonium chloride (i.e. dimethylformamido chloride), relative to the amount of sapogenin is usually used although two moles of formamidinium salt to each mole of sapogenin I is sufficient.

In the conversion of a sapogenin I to ring opened sapogenin derivatives II and III via my novel process, the reaction mixture of sapogenin lower alkanoate ester and formamidinium salt may be kept at temperatures in the range of from about 20–100° C., preferably in the range of from about 25–90° C. When this reaction is done at lower temperature, a longer period of time is needed in which to complete the reaction. Thus, for example, the conversion of diosgenin acetate (I) by means of chloromethylene dimethylammonium chloride (i.e. dimethylformamido chloride) to the psuedosapogenin intermediates of structures II and III is effected in two hours at 90° C., while at room temperature, the conversion takes about 24 hours for completion.

After conversion of the sapogenin I to ring opened sapogenin derivatives II and III, the acidic reaction mixture is neutralized with sodium acetate, for example, and the product mixture containing the 27-chloro-20(22)-furostene (II) and the 23-formyl-27-chloro-22-furostene (III), is easily isolated by extraction with an organic solvent such as ether, chloroform, methylene chloride, and the like. Separation of the 27-chloro-20(22)-furostene (II) from the 23-formyl-27-chloro-22-furostene (III) is then effected via known techniques such as by fraction crystallization or by chomatography. Thus, for example, the mixture of products resulting from the reaction of diosgenin acetate with chloromethylene dimethylammonium chloride is conveniently separated by chomatographing a benzene solution of the product mixture on neutral alumina. By eluting first with benzene there is isolated the pseudosapogenin II, i.e., 3β-acetoxy-27-chloro-5,20(22)-furostadiene, as a crystalline product. Further elution of the column with ether yields the 3β-acetoxy-23-formyl-27-chloro-5,22-furostadiene (III).

The ring opened sapogenin derivatives II and III are valuable mainly as intermediates in the preparation of the corresponding 20-keto-16-pregnenes which, in turn, are valuable as intermediates via known procedures in the preparation of corticoids such as cortisone, hydrocortisone, prednisolone, prednisone, of 16-lower alkyl steriods such as dexamethasone, beta-methasone, of progesterone, and of 16-methylene steroids such as 16-methylene-prednisolone, and the like.

Using oxidative techniques, ring opened sapogenin derivatives II and III are convertible to the 20-keto-16-dehydropregnane VIII via three routes, one utilizing as starting compound the 27-chloro-20(22)-furostene derivative II, another utilizing as starting compound the 23-formyl-27-chloro-22-furostene derivative III, and the third method starting with a mixture of II and III.

The conversion of a 27-chloro-20(22)-furostene is effected by oxidative fission, such as with ozone or with chromium trioxide in acetic acid or pyridine, whereby the 20(22)-double bond is split forming the diosone intermediate (IV) which upon treatment with a base yields the 16-pregnene VIII. Thus, for example, 3β-acetoxy-27-chloro-5,20(22)-furostadiene (derived from diosgenin acetate) upon oxidation with chromium trioxide reagent yields the diosone, 3β-acetoxy-16β-(4'-methyl-5'-chlorovaleroxy)-5-pregnen-20-one which when treated with 40% potassium hydroxide in tertiary-butanol yields 16-dehydropregnenolone (VIII); e.g., 5,16-pregnadiene-3β-ol-20-one. Alternatively, when an alkali metal lower alkanoate such as anhydrous sodium acetate in refluxing dimethylformamide is utilized as the basic reagent in the foregoing procedure, the intermediary 3β-acetoxy-16β-(5'-chloro-4'-methylvaleroxy)-5-pregnen-20-one (compound IV, Chart I wherein Y is chloro) is converted to predominantly 3β-acetoxy-16β-(5'-acetoxy-4'-methylvaleroxy)-5 - pregnen-20-one (compound VI, Chart I wherein Y is acetoxy) which, in turn, upon treatment with acid or base according to β-elimination procedures known in the art (e.g. chromatography over basic alumina) yields 16-dehydropregnenolone (VIII).

When converting the 23-formyl-27-chloro-22-furostene intermediate (III), the reactions utilized are in the reverse order from that used in the process starting with a 27-chloro-20(22)-furostene (II), i.e. initial treatment of III with base, e.g. alkoxides such as sodium and potassium methoxide, ethoxide, and butoxide; alkali metal hydroxides such as sodium and potassium hydroxides; and alkali metal lower alkanoates such as sodium acetate in boiling dimethylformamide, leading to the 16,17(4',5')-[3'-methyl-2'-[3''-(5''-methyldihydropyranyl)] - dihydrofurano] - 5-androstene intermediate V, which, after re-esterification of any hydrolyzed ester protective groups (such as at C-3) followed by oxidation with chromium trioxide in pyridine, for example, yields a mixture comprising some 20-keto-16-pregnene (VIII) together with a predominance of the 16β-substituted carboxylated derivative VII. Conversion of this mixture to the 20-keto-16-pregnene VIII is easily effected by treatment with acid or base.

Thus, for example, 3β-acetoxy-23-formyl-27-chloro-5,22-furostadiene (III) (derived from diosgenin acetate) upon strong basic treatment with a lower alkoxide, e.g. potassium tertiary-butoxide in tertiary-butanol, is converted to 3β-hydroxy-5-androstene - 16,17(4',5') - [3'-methyl-2'-[3''-(5'' - methyldihydropyranyl)] - dihydrofurano]-5-androstene which after esterification with acetic anhydride in pyridine, is subjected to oxidative fission utilizing chromium trioxide in pyridine forming 16β-hydroxy-pregnenolone 3 - acetate 16 - (5' - methyldihydropyranyl-3'-carboxylate) convertible to 16 - dehydropregnenolone acetate (VIII), i.e. 3β-acetoxy-5,16-pregnadiene-20-one, upon treatment with acid or base.

I have found that in this novel process it is not necessary to separate and purify intermediates II and III prior to oxidative treatment thereof to produce a 16-dehydro-20-keto-steriod of the pregnane series. After reaction of a sapogenin lower alkanoate ester, e.g., diosgenin acetate, with a formamidinium salt, e.g. chloromethylene dimethylammonium chloride (dimethylformamido chloride), according to procedures such as described hereinabove, the thereby formed mixture of ring opened sapogenin derivatives II and III, e.g. 3β-acetoxy-27-chloro-5,20(22)-furostadiene (II) and 3β-acetoxy-23-formyl-27-chloro-5,22-furostadiene (III) may be directly subjected first to a strong basic treatment, e.g. with potassium tertiary-butoxide, then, after neutralization and re-esterification of any hydrolyzed ester, oxidation with chromium trioxide in base such as pyridine, followed by treatment with acid or base of the 16β-acyloxy-20-keto pregnane mixture (VI and VII) thereby formed yields a 16-dehydro-20-keto steroid of the pregnane series, e.g. 16-dehydropregnenolone acetate.

In the foregoing procedures, when the strong basic treatment is effected by means of an alkali metal lower alkanoate, e.g. anhydrous sodium acetate in refluxing dimethylformamide, hydrolysis of any ester groups present usually does not occur, and, therefore, there may be eliminated the re-esterification step immediately following the basic treatment. In addition, the alkali metal lower alkanoate basic treatment usually produces a greater yield in purer form of the desired 16-dehydro-20-ketopregnane than do other strong basic reagents. Basic treatment with an alkali metal lower alkanoate (e.g. with sodium acetate) is, therefore, a preferred embodiment of my process, particularly when utilizing the direct method wherein the product mixture (II and III) is not isolated or purified.

My novel process whereby a sapogenin I is converted to ring opened sapogenin derivatives II and III which, in turn, are convertible to a 16-dehydro-20-keto steroid of the pregnane series, is advantageously used over other known procedures involving the conversion of sapogenins to pseudosapogenins, such as the Marker procedure, and variations thereof, such as those utilizing pyridine hydrochloride in acetic anhydride, boiling octanoic anhydride, and other Lewis acid catalysts (Fieser and Fieser, Steroids, Reinhold Publishing Corporation, New York (1959), pp. 549–550).

The prior art procedures all necessitate the use of high temperatures and/or pressures under highly acidic conditions; whereas, my novel process may advantageously be carried out at room temperature or slightly higher in a mildly acidic media. My process, thus, eliminates the necessity for special high pressure or autoclave apparatus as well as the problems associated with the use of corrosive acids at high temperatures.

The following are examples illustrating my invention. It is to be understood that the invention is not to be limited to the exact details of operation or to the exact showings and descriptions as obvious modifications and equivalents will be apparent to one skilled in the art. The invention is, therefore, to be limited only by the scope of the appended claims.

EXAMPLE 1

*Reaction of diosgenin acetate with dimethylformamido chloride to produce 3β-acetoxy-27-chloro-5,20(22)-furostadiene (A) and 3β-acetoxy-23-formyl-27-chloro-5,22-furostadiene (B)*

Introduce phosgene to 50 ml. of dimethylformamide cooled to 0° C., continuing the flow of phosgene at 0° C. until the contents of the flask are set to a solid mass of dimethylformamido chloride.

Add 1 g. of diosgenin acetate to the newly prepared dimethylformamido chloride. Heat the reaction mixture on a steam bath for one hour; then concentrate under reduced pressure to a syrupy residue of small volume. To this residue, add 50 ml. of a saturated sodium acetate solution. Stir the mixture at room temperature for one hour; then extract with four 25 ml. portions of chloroform. Wash the combined chloroform extracts with four 3 ml. portions of water; then dry the chloroform solution over sodium sulfate and concentrate in vacuo to a residue comprising a mixture of 3β - acetoxy -27-chloro-5,20(22)-furostadiene (A) and 3β - acetoxy - 23 - formyl - 27-chloro-5,22-furostadiene (B).

Dissolve the mixture of compounds A and B in 5 ml. of benzene and chromatograph on 30 g. of neutral alumina (activity grade I). Elute with eight 50 ml. fractions of benzene and evaporate the combined fractions to a residue of 300 mg. of 3β - acetoxy - 27 - chloro - 5,20(22)-furostadiene (A). M.P. 110–115° C. $[\alpha]_D$ −45°.

Continue eluting the column with ether. Combine the ether extracts and evaporate to a residue of 300 mg. of 3β - acetoxy - 23 - formyl - 27 - chloro - 5,22 - furostadiene (B). Purify by crystallization from ether. M.P. 143–146° C. $[\alpha]_D$ +18°.

EXAMPLE 2

*Preparation of 16-dehydropregnenolone from 3β-acetoxy-27-chloro-5,20(22)-furostadiene*

A. *16β-(5′-chloro-4′-methyl-valeroxy) - pregnenolone acetate (16β-5′-chloro-4′-methyl - valeroxy - 5 - pregnene-3β-ol-20-one 3-acetate).*—To a solution of 200 mg. of 3β - acetoxy - 27 - chloro - 5,20(22) - furostadiene (product A prepared in Example 1) in 10 ml. of glacial acetic acid, add 7 ml. of chromium trioxide (1 g. $CrO_3$/100 ml. of 90% acetic acid). Allow the solution to stand at room temperature for 5 hours. Decompose the excess chromium trioxide with methanol and dilute the solution with 50 ml. of water. Extract the aqueous mixture with ether; then evaporate the combined extracts to a residue substantially of 16β - (5′ - chloro - 4′ - methyl - valeroxy)-pregnenolone acetate which is used without further purification in following procedure 2B.

B. *16-dehydropregnenolone.*—Dissolve the 16β - (5′-chloro - 4′ - methyl - valeroxy) - pregnenolone acetate prepared in preceding Example 2A in 10 ml. of tertiary-butanol containing 1 ml. of 40% potassium hydroxide. Reflux the solution for 3 hours, cool, and pour into water. Extract the aqueous mixture with ether and evaporate the combined extracts to a residue of 16-dehydropregnenolone. M.P. 197–203° C. Yield=88 mg.

EXAMPLE 3

*Preparation of 16-dehydropregnenolone acetate from 3β-acetoxy-23-formyl-27-chloro-5,22-furostadiene*

A. *3β - acetoxy - 16,17(4′,5′) - [3′ - methyl - 2′ - [3″-(5″ - methyl - dihydropyranyl)] - dihydrofurano] - 5-androstene.*—To a solution of 4 g. of potassium in 200 ml. of tertiary-butanol, add 3 g. of 3β - acetoxy - 23 - formyl-27 - chloro - 5,22 - furostadiene (product B of Example 1). Reflux the solution under nitrogen for three and one-half hours; cool and neutralize with acetic acid. Dilute with water and extract with ether. Evaporate the combined ether extracts to a residue of substantially 3β-hydroxy - 16,17(4′,5′) - [3′ - methyl - 2′ - [3″ - (5″-methyl - dihydropyranyl)] - dihydrofurano] - 5 - androstene. Yield=2.34 g. Purify by crystallization from methanol-ether. M.P. 155–161° C. $[\alpha]_D$ −111°.

Acetylate the 3β - hydroxy - 16,17 - (4′,5′) - dihydrofurano - 5 - androstene prepared as in the preceding paragraph by reaction with acetic anhydride in pyridine according to known procedures to give 3β-acetoxy-16,17(4′,5′) - [3′ - methyl - 2′ - [3″ - (5″ - methyldihydropyranyl)] - dihydrofurano]-5 - androstene. M.P. 136–139° C.

B. *16-dehydropregnenolone acetate.*—To a solution of 200 mg. of the 3β - acetoxy - 16,17(4′,5′) - dihydrofurano - 5 - androstene derivative (prepared in Example 3A) in 10 ml. of pyridine, add a slurry of 200 mg. of chromium trioxide in 5 ml. of pyridine. Allow the mixture to stand overnight at room temperature. Destroy the excess chromium trioxide with sodium bisulfite and extract the reaction mixture with ether. Evaporate the combined ether extracts to a residue comprising 16β - hydroxypregnenolone 3 - acetate 16-(5′ - methyldihydropyranyl-3′-carboxylate) and chromatograph this residue over basic alumina eluting with benzene. Evaporate the combined benzene fractions to a residue of 16-dehydropregnenolone acetate. M.P. 171–172° C. Yield=70 mg.

EXAMPLE 4

*Preparation of 16-dehydropregnenolone acetate directly from diosgenin acetate*

Prepare dimethylformamido chloride by saturating 400 ml. of dimethylformamide with phosgene at 0° C. in the manner described in the first paragraph of Example 1. To the dimethylformamido chloride thus prepared add 10 g. of diosgenin acetate and heat the mixture on a steam bath under an atmosphere of nitrogen for two hours. Cool the reaction mixture and remove the dimethylformamide in vacuo. To the resultant residue add 200 ml. of a saturated sodium acetate solution in admixture with crushed ice. Stir the mixture for one hour and extract with four 100 ml. portions of chloroform. Wash the combined extracts with water, dry, and evaporate in vacuo to a residue comprising a mixture of 3β - acetoxy - 27-chloro - 5,20(22) - furostadiene (A) and 3β - acetoxy-23 - formyl - 27 - chloro - 5,22 - furostadiene (B). Yield=12 g.

Dissolve the mixture of compounds A and B prepared in the preceding paragraph in 150 ml. of tertiary-butanol and add 19 g. of potassium tertiary-butoxide. Reflux the solution under nitrogen for 4 hours. Add acetic acid until the reaction mixture is brought to neutrality; then pour onto crushed ice and extract with ether. Evaporate the combined ether extracts to a residue; then acetylate this residue by dissolving it in 100 ml. of pyridine and 100 ml. of acetic anhydride and allow the solution to stand at room temperature for 4 hours. Distill the reaction mixture in vacuo and dissolve the resultant residue in 75 ml. of pyridine. To the pyridine solution add 15 g. of chromic oxide suspended in 100 ml. of pyridine. Allow the mixture to stand overnight at room temperature, then pour onto crushed ice. Decompose the excess chromic oxide with sodium bisulfite and extract the reaction mixture with ether. Evaporate the combined ether extracts to a residue comprising 16-dehydropregnenolone acetate in admixture with 16β-hydroxypregnenolone 3-acetate 16-(5'-methyldihydropyranyl-3'-carboxylate) and 16β-(5'-chloro-4'-methylvaleroxy)-pregnenolone acetate. Yield=6.37 g. Convert by chromatography on basic alumina eluting with benzene to obtain 3.32 g. (33% by weight) of 16-dehydropregnenolone acetate.

EXAMPLE 5

*Preparation of 16-dehydropregnenolone acetate from yamogenin acetate*

In a manner similar to that described in Example 4, treat 10 g. of yamogenin acetate with dimethylformamido chloride. Isolate the resultant product comprising a mixture of 3β-acetoxy-27-chloro-5,20(22)-furostadiene and 3β-acetoxy-23-formyl-27-chloro-5,22-furostadiene.

In the manner described in Example 4, treat this product mixture first with potassium tertiary-butoxide in tertiary-butanol. After isolation and re-esterification with acetic anhydride in pyridine, treat the resultant product with chromic oxide in pyridine followed by chromatography of the product mixture isolated therefrom over basic alumina to obtain 16-dehydropregnenolone acetate.

EXAMPLE 6

*Reaction of hecogenin acetate with dimethylformamido chloride to produce 3β-acetoxy-12-keto-27-chloro-5α-20(22)-furostene (A) and 3β-acetoxy-12-keto-23-formyl-27-chloro-5α-22-furostene (B)*

Introduce phosgene to one liter of dimethylformamide cooled to 0° C. in a manner similar to that described in Example 1. After a thick slurry of dimethylformamido chloride has formed, add 25 g. of hecogenin acetate. Heat the mixture on a steam bath for one and one-half hours; then distill the dimethylformamide under reduced pressure. To the resultant residue add 300 ml. of chloroform and 400 ml. of a saturated solution of sodium acetate and stir the mixture vigorously for 2 hours. Separate the chloroform layer and extract the aqueous layer with five 200 ml. portions of chloroform. Add the chloroform extracts to the original organic layer and wash the combined solution with water; then dry over magnesium sulfate and evaporate in vacuo to a residue comprising a mixture of 3β-acetoxy-12-keto-27-chloro-5α-20(22)-furostene (A) and 3β-acetoxy-12-keto-23-formyl-27-chloro-5α-22-furostene (B).

Dissolve the mixture of compounds A and B in a minimum volume of benzene and chromatograph on 1500 g. of alumina, eluting first with benzene (four 1500 ml. washes); then add a 1:1 mixture of methylene chloride-benzene (4000 ml.), and elute finally with methylene chloride (3000 ml.). Evaporate the methylene chloride-benzene eluates to a residue of 3β-acetoxy-12-keto-27-chloro-5α-20(22)-furostene (A). Yield=8 g. Purify by recrystallization from methanol. M.P. 115–117° C. $[\alpha]_D$ +68°.

Evaporate the methylene chloride eluate to a residue comprising 3β - acetoxy - 12 - keto - 23 - formyl - 27 - chloro-5α-22-furostene (B). Yield=5.76 g.

Purify by hydrolyzing with methanolic potassium hydroxide (to 500 mg. of the 3-acetate compound B add 40 ml. of 5% methanolic potassium hydroxide). Heat the hydrolysis mixture 20 minutes under nitrogen; then dilute the mixture with water and filter the resultant precipitate of 3β-hydroxy-12-keto-23-formyl-27-chloro-5α-22-furostene. Purify by crystallization from methylene chloride-methanol. M.P. 225–227° C. $[\alpha]_D$ +116°.

EXAMPLE 7

*Preparation of 5α-16-pregnene-3β-ol-12,20-dione*

A. In a manner similar to that described in Example 2A, treat 3β-acetoxy-12-keto-27-chloro-5α-20(22)-furostene (6A) in acetic acid with chromium trioxide. Isolate and purify the resultant product in a manner similar to that described to give 16β-(5'-chloro-4'-methyl-valeroxy)-5α-pregnane-3β-ol-12,20-dione 3-acetate.

Treat the 3β-acetoxy-5α-pregnane prepared in the preceding paragraph in tertiary-butanol with 40% potassium hydroxide in a manner similar to that described in Example 2B whereby is obtained 5α,16-pregnene-3β-ol-12,20-dione.

B. In a manner similar to that described in Example 3A, treat 3β-acetoxy-12-keto-23-formyl-27-chloro-5α-22-furostene (6B) with potassium in tertiary-butanol and isolate and purify the resultant product in the described manner whereby is obtained 3β-acetoxy-12-keto-16,17-(4',5') - [3' - methyl-2'[3''-(5''-methyldihydropyranyl)]-dihydrofurano]-androstane.

In a manner similar to that described in Example 3B, treat the product prepared in the preceding paragraph with chromium trioxide in pyridine. Isolate the resultant product comprising 3β-acetoxy-12-keto-16β-hydroxy-5α-pregnane 20-one 16-(5'-methyl-dihydropyranyl-3'-carboxylate), in the described manner, followed by chromatography over basic alumina to obtain 5α-16-pregnene-3β-ol-12,20-dione 3-acetate.

Hydrolyze the 3β-acetoxy-16-pregnene with potassium hydroxide in tertiary-butanol in a manner similar to that described in Example 2B to obtain 5α-16-pregnene-3B-ol-12,20-dione.

C. In a manner similar to that described in Example 4, treat hecogenin acetate with dimethylformamido chloride whereby is obtained a mixture of 3β-acetoxy-12-keto-27-chloro-5α-20(22)-furostene (6A) and 3β-acetoxy-12-keto-23-formyl-27-chloro-5α-22-furostene (6B).

In turn, treat the mixture of compounds 6A and 6B prepared in the preceding paragraph first with potassium tertiary butoxide in tertiary-butanol, then with acetic anhydride in pyridine in order to re-esterify any hydrolyzed 3β-acetoxy group, and finally with chromium trioxide followed by chromatography over basic alumina of the thereby formed mixture comprising 5α-16-pregnene-3β-ol-12,20-dione 3-acetate, 3β-acetoxy-12-keto-16β-(5'-chloro-4'-methyl-valeroxy)-5α-pregnane-20-one and 3β-acetoxy-12-keto-16β-hydroxy-5α-pregnane-20-one 16-(5'-methyl-dihydropyranyl-3-carboxylate) whereby is obtained 5α-16-pregnene-3β-ol-12,20-dione 3-acetate, which is hydrolyzed with potassium hydroxide and tertiary-butanol in the manner of Example 2B to give 5α-16-pregnene-3β-ol-12,20-dione.

EXAMPLE 8

*Preparation of 5α-16-pregnene-3β-ol-11,20-dione from hecogenin acetate*

A. *Reaction of 11-keto-tigogenin acetate with dimethylformamido chloride.*—The necessary intermediate, i.e., 11-keto-tigogenin acetate is prepared from hecogenin acetate according to known procedures such as those described on pages 669–671, Steroids, Fieser and Fieser, Reinhold Publishing Corporation, New York (1959).

In a manner similar to that described in Example 1, react 11-keto-tigogenin acetate with dimethylformamido chloride and from the resultant product mixture, isolate and purify each of 3β-acetoxy-11-keto-27-chloro-5α-20(22)-furostene (product 8A-1) and 3β-acetoxy-11-keto - 23 - formyl - 27 - chloro-5α-22-furostene (product A-2).

B. *5α-16-pregnen-3β-ol-11,20-dione.*—(1) In a manner similar to that described in Example 2A, react 3β- acetoxy-11-keto-27-chloro-5α-20(22)-furostene with chromium trioxide in acetic acid to obtain 16β-(5′-chloro- and the 23-formyl-27-chloro-20-furostene derivatives A-2 to H-2.

TABLE I

| Sapogenins | Product 1 | Product 2 |
| --- | --- | --- |
| A. Sarsapogenin acetate | 9A-1 3β-acetoxy-27-chloro-20(22)-furostene. | 9A-2 3β-acetoxy-23-formyl-27-chloro-22-furostene. |
| B. Smilagenin acetate | 9B-1 3β-acetoxy-27-chloro-20(22)-furostene. | 9B-2 3β-acetoxy-23-formyl-27-chloro-22-furostene. |
| C. Neotigogenin acetate | 9C-1 3β-acetoxy-27-chloro-5α-20(22)-furostene. | 9C-2 3β-acetoxy-23-formyl-27-chloro-5α-22-furostene. |
| D. Tigogenin acetate | 9D-1 3β-acetoxy-27-chloro-5α-20(22)-furostene. | 9D-2 3β-acetoxy-23-formyl-27-chloro-5α-22-furostene. |
| E. Neohecogenin acetate | 9E-1 3β-acetoxy-12-keto-27-chloro-5α-20(22)-furostene. | 9E-2 3β-acetoxy-2-keto-23-formyl-27-chloro-5α-22-furostene. |
| F. Rockogenin diacetate | 9F-1 3β,12β-diacetoxy-27-chloro-5α-20(22)-furostene. | 9F-2 3β,12β-diacetoxy-23-formyl-27-chloro-5α-22-furostene. |
| G. Neobotogenin acetate | 9G-1 3β-acetoxy-12-keto-27-chloro-5,20(22)-furostadiene. | 9G-2 3β-acetoxy-12-keto-23-formyl-27-chloro-5,22-furostadiene. |
| H. Botogenin acetate | 9H-1 3β-acetoxy-12-keto-27-chloro-5,20(22)-furostadiene. | 9H-2 3β-acetoxy-12-keto-23-formyl-27-chloro-5,22-furostadiene. |

4′-methyl-valeroxy)-5α-pregnane-3β-ol-11,20-dione 3-acetate, which upon treatment with 40% potassium hydroxide in tertiary-butanol according to the procedure of Example 2B is converted to 5α-16-pregnene-3β-ol-11,20-dione.

(2) In a manner similar to that described in Example 3A, react the 23-formyl-27-chloro-22-furostene derivative 8A-2 with potassium butoxide to obtain 3β-acetoxy-16,17(4′,5′)-[3′ - methyl - 2′-[3′′-(5′′-methyldihydropyranyl)]-dihydrofurano]-androstane which, upon reaction with chromium trioxide in pyridine according to the procedure of Example 3B forms 16β-hydroxy-5α-pregnane-3β-ol-11,20-dione 3-acetate 16-(5′-methyldihydropyranyl-3′-carboxylate) which, when chromatographed over basic alumina, is converted to 5α-16-pregnene-3β-ol-11,20-dione 3-acetate which, upon hydrolysis with potassium hydroxide in tertiary-butanol in the manner of Example 2B, will yield 5α-16-pregnene-3β-ol-11,20-dione.

(3) In a manner similar to that described in Example 4, react 11-keto-tigogenin acetate with dimethylformamido chloride to obtain a product comprising a mixture of compounds 8A-1 and 8A-2, which upon reaction with potassium tertiary-butoxide in tertiary-butanol and esterification of the product resulting therefrom with acetic anhydride in pyridine followed by oxidation with chromium oxide and chromatography over basic alumina will yield 5α-16-pregnen-3β-ol-11,20-dione.

EXAMPLE 9

In a manner similar to that described in Example 1, react each of the sapogenins listed in column 1, Table I, below, with dimethylformamido chloride and isolate and purify from the resultant respective product mixtures, the respective products 1 and 2 listed below in Table I, i.e., 27-chloro-20(22)-furostene derivatives A-1 to H-1

EXAMPLE 10

In a manner similar to that described in Example 2, react each of the 27-chloro-20(22)-furostene derivatives prepared in Example 9 with chromium trioxide in acetic acid to produce the respective 16β-valeroxy intermediates 10A-1 to 10H-1 listed below in column 2, Table II. In turn, react each of the 16β-valeroxy intermediates with potassium hydroxide in tertiary-butanol in the described manner to produce the respective 20-keto-16-dehydropregnane products (10A-2 to 10H-2) listed in column 3, Table II, below.

TABLE II

| Starting Compound | 16β-Valeroxy Intermediate | Product |
| --- | --- | --- |
| 9A-1 | 10A-1 16β-(5′-chloro-4′-methylvaleroxy)-pregnane-3β-ol-20-one 3-acetate. | 10A-2 16-pregnene-3β-ol-20-one. |
| 9B-1 | 10B-1 16β-(5′-chloro-4′-methylvaleroxy)-pregnane-3β-ol-20-one 3-acetate. | 10B-2 16-pregnene-3β-ol-20-one. |
| 9C-1 | 10C-1 16β-(5′-chloro-4′-methylvaleroxy)-5α-pregnane-3β-ol-20-one 3-acetate. | 10C-2 5α-16-pregnene-3β-ol-20-one. |
| 9D-1 | 10D-1 16β-(5′-chloro-4′-methylvaleroxy)-5α-pregnane-3β-ol-20-one 3-acetate. | 10D-2 5α-16-pregnene-3β-ol-20-one. |
| 9E-1 | 10E-1 16β-(5′-chloro-4′-methylvaleroxy)-5α-pregnane-3β-ol-12,20-dione 3-acetate. | 10E-2 5α-16-pregnene-3β-ol-12,20-dione. |
| 9F-1 | 10F-1 16β-(5′-chloro-4′-methylvaleroxy)-5α-pregnane-3β,12β-diol-20-one diacetate. | 10F-2 5α-16-pregnene-3β-12β-diol-20-one. |
| 9G-1 | 10G-1 16β-(5′-chloro-4′-methylvaleroxy)-5-pregnene-3β-ol-12,20-dione 3-acetate. | 10G-2 5,16-pregnadiene-3β-ol-12,20-dione. |
| 9H-1 | 10H-1 16β-(5′-chloro-4′-methylvaleroxy)-5-pregnene-3β-ol-12,20-dione 3-acetate. | 10H-2 5,16-pregnadiene-3β-ol-12,20-dione. |

EXAMPLE 11

In a manner similar to that described in Example 3A, react each of the 23-formyl-27-chloro-22-furostene derivatives prepared in Example 9 with potassium tertiary-butoxide then reacetylate the 3β-hydroxy product thereby formed to produce the respective 16,17-dihydrofurano-androstane intermediates (11A-1 to 11H-1) listed in column 2, Table III, below. In turn, react each of the 16,17-dihydrofurano-androstane intermediates with chromium trioxide in pyridine in the manner described in Example 3B to obtain the 16β-substituted carboxy-pregnane intermediates (11A-2 to 11H-2) listed below in column 3, Table III. Treatment with base (e.g. chromatography over basic alumina) yields the 3-acetate esters of products 10A-2 to 10H-2 (Table II) which are identified below in column 4, Table III as 11A-3 to 11H-3. Hydrolysis of each of the products listed in column 3, Table III with potassium hydroxide in tertiary-butanol in the manner described in Example 2B will yield the corresponding 3β-hydroxy derivatives listed in Table II, column 3, of Example 10 as products 10A-2 through 10H-2.

TABLE III

| Starting Compound | 16,17-Dihydrofuranoandrostane Intermediate | 16β-Substituted Carboxy Pregnano Intermediate | Esterified Product |
|---|---|---|---|
| 9A-2 | 11A-1 3β-acetoxy-16,17(4',5')-[3'-methyl-2'-[3''-(5''-methyldihydropyranyl)]-dihydrofurano]-5β-androstane. | 11A-2 3β-acetoxy-16β-hydroxypregnane-20-one-16-(5'-methyldihydropyranyl-3'-carboxylate). | 11A-3 (10A-2 3-acetate). |
| 9B-2 | 11B-1 3β-acetoxy-16,17(4',5')-[3'-methyl-2'-[3''-(5''methyldihydropyranyl)]-dihydrofurano]-5β-androstane. | 11B-2 3β-acetoxy-16β-hydroxypregnane-20-one-16-(5'-methyldihydropyranyl-3'-carboxylate). | 11B-3 (10B-2 3-acetate). |
| 9C-2 | 11C-1 3β-acetoxy-16,17(4',5')-[3'-methyl-2'-[3''-(5''-methyldihydropyranyl)]-dihydrofurano]-androstane. | 11C-2 3β-acetoxy-16β-hydroxy-5α-pregnane-20-one 16-(5'-methyldihydropyranyl-3-carboxylate). | 11C-3 (10C-2 3-acetate). |
| 9D-2 | 11D-1 3β-acetoxy-16,17(4',5)-[3'methyl 2'-[3''-(5''methyldihydropyranyl)]-dihydrofurano]-androstane. | 11D-2 3β-acetoxy-16β-hydroxy-5α-pregnane-20-one 16-(5'-methyl-3'-dihydropyranyl-carboxylate). | 11D-3 (10D-2 3-acetate). |
| 9E-2 | 11E-1 3β-acetoxy-12-keto-16,17(4',5')-[3'-methyl-2'-[3''-(5''-methyldihydropyranyl)]dihydropyranylcarboxylate). | 11E-2 3β-acetoxy-12-keto-16β-hydroxy-5α-pregnane-20-one 16-(5'-methyl-3'-dihydropyranylcarboxylate). | 11E-3 (10E-2 3-acetate). |
| 9F-2 | 11F-1 3β,12β-diacetoxy-16,17(4',5')-[3'-methyl-2'-[3''-(5''-methyldihydropyranyl)]-dihydrofurano]-androstane. | 11F-2 3β,12β-diacetoxy-16β-hydroxy-5α-pregnane-20-one 16-(5'-methyl-3'-dihydropyranylcarboxylate). | 11F-3 (10F-2 diacetate). |
| 9G-2 | 11G-1 3β-acetoxy-12-keto-16,17(4',5')-[3'-methyl-2'-[3''-(5''-methyldihydropyranyl)]-dihydrofurano]-5-androstene. | 11G-2 3β-acetoxy-12-keto-16β-hydroxy-5-pregnene-20-one 16-(5'-methyl-3'-dihydropyranylcarboxylate). | 11G-3 (10G-2 3-acetate). |
| 9H-2 | 11H-1 3β-acetoxy-12-keto-16,17(4',5')-[3'-methyl-2'-[3''-(5''-methyldihydropyranyl)]-dihydrofurano]-5-androstene. | 11H-2 3β-acetoxy-12-keto-16β-hydroxy-5-pregnene-20-one 16-(5'-methyl-3'-dihydropyranylcarboxylate). | 11H-3 (10H-2 3-acetate). |

EXAMPLE 12

By treating each of the sapogenin starting materials listed in column 1, Table I, of Example 9 with dimethylformamido chloride in a manner similar to that described in Example 4, followed by subsequent treatment of the product mixture in a manner similar to that described in Example 4, there is obtained directly the respective 20-keto-16-pregnene 3-acetate derivative, i.e., the respective products identical with those listed in column 4, Table III.

EXAMPLE 13

*Preparation of 3-hydroxy derivatives*

In a manner similar to that described in Example 2B, hydrolyze by means of 40% potassium hydroxide in tertiary-butanol 3β - acetoxy - 27 -chloro - 5,20(22) - furostadiene, 3β - acetoxy - 12 - keto - 27 - chloro - 20(22)-furostene, 3β - acetoxy - 23 - formyl - 27 - chloro - 22-furostene, 3,β - acetoxy - 12 - keto - 23 - formyl - 27 -chloro - 22 - furostene, 3β - acetoxy - 16,17(4',5') - [3'-methyl - 2' - [3'' - (5'' - methyldihydropyranyl)] - dihydrofurano - androstane, and 3β - acetoxy - 12 - keto-16,17(4',5') - [3' - methyl - 2' - [3'' - (5'' - methyl - dihydropyranyl)] - dihydrofurano] - androstane, and there is obtained the respective 3 - hydroxy derivatives, i.e., 3β - hydroxy - 27 -chloro - 5,20(22) - furostadiene, 3β-hydroxy - 12 - keto - 27 - chloro - 20(22) - furostene, 3β-hydroxy - 23 - formyl - 27 - chloro - 22 - furostene, 3β-hydroxy - 12 -keto - 23 - formyl - 27 - chloro - 22 - furostene, 3β - hydroxy - 16,17(4',5') - [3' - methyl - 2'-[3'' - (5'' - methyldihydropyranyl)] - dihydrofurano]-androstane, and 3β - hydroxy - 12 - keto - 16,17(4',5')-[3' - methyl - 2' - [3'' - (5'' - methyldihydropyranyl)]-dihydro - furano] - androstane.

In a similar manner, the 3β - acetoxy derivatives of Example 9 (products 1 and 2—Table I) and the 3β - acetoxy intermediates of Example 11 (Table III) are hydrolyzed with potassium hydroxide to give the respective, corresponding 3 - hydroxy compounds.

EXAMPLE 14

*Preparation of 16-dehydropregnenolone acetate from 3β-acetoxy - 23 - formyl - 27 - chloro - 5,22 - furostadiene utilizing sodium acetate*

A. To a solution of 1 g. of 3β - acetoxy - 23 - formyl - 27 - chloro - 5,22 - furostadiene (product B of Example 1) in 100 ml. of dimethylformamide, add 6 g. of anhydrous sodium acetate. Heat the mixture at reflux temperature under a nitrogen atmosphere for four hours, then cool and pour into 200 ml. of water. Filter the resultant precipitate comprising 3β - acetoxy - 16,17(4',5') - [3' - methyl-2' - [3'' - (5'' - methyl - dihydropyranyl)] - dihydrofurano] - 5 - androstene. M.P. 136–139° C. Yield= 870 mg. (This product is identical with that of Example 3A.)

B. In a manner similar to that described in Example 3B, oxidize the 3β - acetoxy - 16,17(4',5') - dihydrofurano - 5 - androstene derivative (prepared as described in Example 14A above) by means of chromium trioxide in pyridine. Isolate the resultant product in the described manner and chromatograph over basic alumina to obtain 16-dehydropregnenolone acetate.

In a manner similar to that described in Example 14A above, react each of the 23 - formyl - 27 - chloro - 22-furostene derivatives prepared in Example 9, i.e. products 9A-2 through 9H-2 (Table I, product 2) with anhydrous sodium acetate in dimethylformamide. Isolate the respective resultant products in a manner similar to that described in the first paragraph above to obtain respectively the 16,17-dihydrofurano androstane intermediaates, 11A-1 through 11H-1 listed in Table III, column 2 of Example 11.

EXAMPLE 15

*Preparation of 16 - dehydropregnenolone acetate directly from diosgenin acetate utilizing sodium acetate*

A. To a solution of 12 percent phosgene in 100 ml. of chloroform (.122 mole phosgene) cooled in an ice bath, add dropwise 16 ml. of dimethylformamide (.206 mole), then add 5 g. of diosgenin acetate. Reflux the reaction mixture under nitrogen for 6.5 hours, then cool to room temperature and add 100 ml. of a saturated aqueous sodium acetate solution. Stir for one hour, then separate the aqueous layer from the organic solution layer. Wash the aqueous layer three times with 50 ml. of chloroform. Add the chloroform extracts to the original chloroform reaction solution, then dry the combined solution over sulfate and evaporate in vacuo to a residue comprising a mixture of 3β - acetoxy - 27 - chloro - 5,20(22) - furostadiene (A) and 3β - acetoxy - 23 formyl - 27 - chloro - 5,22-furostadiene (B). Yield=6.13 g.

B. Dissolve the mixture of compounds A and B prepared in above procedure 15A in 200 ml. of anhydrous dimethylformamide, then add 40 g. of anhydrous sodium acetate, and heat the reaction mixture at reflux temperature under an atmosphere of nitrogen overnight. Cool the reaction mixture, add 150 ml. of anhydrous benzene, then filter, washing the sodium acetate residue with benzene and dimethylformamide. Add the wash, organic solvents to the main reaction solution, evaporate the combined solution in vacuo, dissolve the resultant residue in chloroform, then wash the chloroform solution with water, dry over sodium sulfate, filter, and evaporate in vacuo to a residue comprising a mixture of 3β,27 - diacetoxy-5,20(22) - furostadiene (C) and 3β - acetoxy - 16,17 (4',5') - [3' - methyl - 2' - [3'' - (5'' - methyl - dihydropyranyl)] - dihydrofurano] - 5 - androstene (product D). Weight=6.23 g.

This product is used without purification in the oxidation step immediately following:

C. Dissolve the crude product mixture (prepared in the preceding paragraph) in about 80 ml. of dry pyridine, then add 7 g. of chromic oxide and allow the reaction mixture to stand overnight at room temperature. Pour the reaction mixture onto crushed ice, decompose the excess chromic oxide with sodium bisulfite and acidify with hydrochloric acid. Extract the reaction mixture with chloroform, then wash the combined chloroform extracts with water and dry over sodium sulfate. Evaporate the combined chloroform extracts to a residue comprising 16-dehydropregnenolone acetate in admixture with 16β-hydroxy - pregnenolone 3 - acetate 16 - (5' - methyldihydropyranyl - 3' - carboxylate) and 16β - (5' - acetoxy - 4'-methylvaleroxy) - pregnenolone acetate. Yield=5.5 g. Convert by chromatography on basic alumina eluting with benzene-ether, then ether, chloroform, and finally with chloroform/methanol. Combine the like, early fractions to obtain 2 g. (40% yield by weight) of 16 - dehydropregnenolone acetate.

EXAMPLE 16

In a manner similar to that described in Example 15, treat each of the sapogenin starting materials A–H listed in column 1, Table I (Example 9) with dimethylformamido chloride according to procedure 15A, followed by treatment of each of the thereby obtained respective product mixtures with anhydrous sodium acetate in dimethylformamide as described in procedures 15B, to obtain, respectively, product mixtures comprising (16A–1 and 16A–2), (16B–1 and 16B–2), etc. through (16H–1 and 16H–2), respectively. In these mixtures, products 16A–2 through 16H–2 are identical with products 11A–1 through 11H–1 listed in column 2, Table III (Example 11), and products 16A–1 through 16H–1 are respectively as follows:

16A–1—3β,27-diacetoxy-20(22)-furostene,
16B–1—3β,27-diacetoxy-20(22)-furostene,
16C–1—3β,27-diacetoxy-5α-20(22)-furostene,
16D–1—3β,27-diacetoxy-5α-20(22)-furostene,
16E–1—3β,27-diacetoxy-12-keto-5α-20(22)-furostene,
16F–1—3β,12β,27-triacetoxy-5α-20(22)-furostene,
16G–1—3β,27-diacetoxy-12-keto-5,20(22)-furostadiene, and
16H–1—3β,27-diacetoxy-12-keto-5,20(22) - furostadiene.

Treat each of the respective crude product mixtures (16A–1 and 16A–2), (16B–1 and 16B–2), etc. through (16H–1 and 16H–2) with chromic oxide in dry pyridine in the manner described in Example 15C to obtain, in each instance, product mixtures comprising 16-dehydropregnenolone acetate in admixture with (16A–3 and 16A–4), (16B–3 and 16B–4), etc. through (16H–3 and 16H–4), respectively. In these mixtures, compounds 16A–4 to 16H–4, respectively, are identical with the 16β-substituted carboxy pregnane intermediates 11A–2 through 11H–2 listed in column 3, Table III (Example 11), and intermediates 16A–3 through 16H–3 are as follows:

16A–3—16β-(5'-acetoxy-4'-methylvaleroxy)-pregnane-3β-ol-20-one 3-acetate,
16B–3—16β-(5'-acetoxy-4'-methylvaleroxy)-pregnane-3β-ol-20-one 3-acetate,
16C–3—16β-(5'-acetoxy-4'-methylvaleroxy)-5α-pregnane-3β-ol-20-one 3-acetate,
16D–3—16β-(5'-acetoxy-4'-methylvaleroxy)-5α-pregnane-3β-ol-20-one 3-acetate,
16E–3—16β-(5'-acetoxy-4'-methylvaleroxy)-5α-pregnane-3β-ol-12,20-dione 3-acetate,
16F–3—16β-(5'-acetoxy-4'-methylvaleroxy)-5α-pregnane-3β,12β-diol-20-one diacetate,
16G–3—16β-(5'-acetoxy-4'-methylvaleroxy)-5-pregnene-3β-ol-12,20-dione 3-acetate, and
16H–3—16β-(5'-acetoxy-4'-methylvaleroxy)-5-pregnene-3β-ol-12,20-dione 3-acetate.

Convert each of the aforementioned product mixtures by chromatography on basic alumina in the manner described in Example 15C to obtain, respectively, 3β-acetoxy 16-dehydro pregnanes identical to products 11A–3 through 11H–3 listed in column 4, Table III (Example 11).

EXAMPLE 17

*Preparation of 16-dehydropregnenolone acetate from diosgenin acetate utilizing bromomethylene dimethylammonium bromide (dimethylformamido bromide)*

A. *Via the direct route utilizing anhydrous sodium acetate.*—To a stirred solution of 12 g. of dimethylformamide in 40 ml. of dry chloroform cooled in an ice bath, add dropwise 34 g. (0.125 mole) of a distilled phosphorous tribromide. Continue stirring as the white crystalline mass of bromoethylene dimethylammonium bromide precipitates, then add 5 g. (0.011 mole) of diosgenin acetate. Stir at reflux temperature under an atmosphere of nitrogen for aboue six hours, then evaporate in vacuo. To the resultant residue, add 100 g. of ice followed immediately with solid sodium hydrogen bicarbonate. Stir the mixture at room temperature for one hour, then extract with chloroform. Wash the combined chloroform extracts with water, then dry the chloroform solution over sodium sulfate and concentrate in vacuo to a residue comprising a mixture of 3β-acetoxy-27-bromo-5,20(22)-furostadiene (A) and 3β-acetoxy-23-formyl-27-bromo 5,22-furostadiene (B). This product mixture of 17A and 17B is used without further purification directly in the following procedure.

Dissolve the mixture of compounds 17A and 17B in 200 ml. of anhydrous dimethylformamide. Then add 10 g. of organic sodium acetate and heat the mixture at reflux temperature under an atmosphere of nitrogen overnight. Cool the reaction mixture, then add 150 ml. of anhydrous benzene, filter and wash the sodium acetate residue with benzene and dimethylformamide. Add the wash, organic solvents to the main reaction solution and evaporate the combined solution in vacuo. Dissolve the resultant residue in chloroform, then wash the chloroform solution with water. Dry over sodium sulfate, filter, and evaporate in vacuo to a residue comprising a mixture of 3β,27-diacetoxy-5,20(22)-furostadiene (Product 17C) and 3β-acetoxy-16,17-(4',5')-[3'-methyl-2'-[3''-(5'' - methyl - dihydropyranyl] - dihydrofurano] - 5-androstene (product 17D). This product mixture is used without further purification in the oxidation step immediately following.

Treat the crude product mixture 17C and 17D, dissolved in dry pyridine, with chromic oxide in a manner similar to that described in Example 15C. Isolate the resultant product in the described manner to obtain a residue comprising 16-dehydropregnenolone acetate in admixture with 16β-hydroxypregnenolone 3-acetate 16-(5'-methyldihydropyranyl-3'-carboxylate) (product 17E) and 16β-(5'-acetoxy-4'-methylvaleroxy) pregnenone 3-acetate (product 17F). Purify by chromatography on basic alumina eluting with benzene-ether, then ether, chloroform, and finally with chloroform/methanol to obtain 16-dehydropregnenolone.

B. *Direct route utilizing potassium tertiary butoxide.*— In a manner similar to that described in the second paragraph of Example 4, dissolve the mixture of compound 17A and 17B prepared in the first paragraph of Example 17A in tertiary butanol and treat with potassium tertiary-butoxide. Isolate the resultant product mixture, then reacetylate by means of acetic anhydride in pyridine followed by oxidation with chromic acid in a manner similar to that described in Example 4 to obtain a product mixture comprising 16-dehydropregnenolone acetate in admixture with compound 17E and 17F. Chromatograph on basic alumina to obtain 16-dehydropregnenolone acetate.

EXAMPLE 18

In the procedures described in Examples 1, 4, 5, 6, 8, 9, 12, 15 and 16 in place of chloromethylene dimethylammonium chloride, substitute formamidinium salts prepared in the following described manner, and there will be formed the same products described in each of the foregoing examples.

(1) Dichlorophosphoryloxymethylene dimethylammonium chloride prepared by reaction of phosphorous oxychloride with dimethylformamide

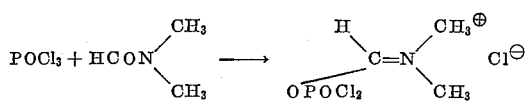

(2) Para-toluene-sulfonyloxymethylene dimethylammonium chloride prepared by reaction of p-toluene-sulfonylchloride with dimethylformamide

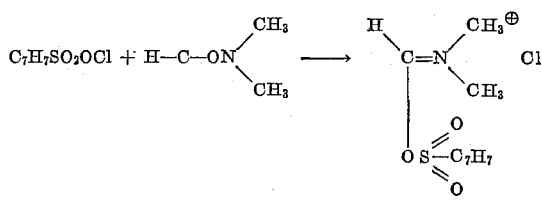

(3) Hydroxy sulfonyloxymethylene dimethylammonium chloride (i.e. bisulfatomethylene dimethylammonium chloride) prepared by reaction of chlorosulfonic acid with dimethylformamide

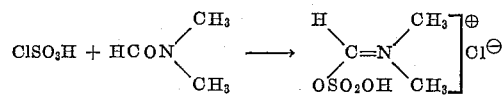

(4) 1-methyl-1-dichlorophosphoryloxymethylene diethylammonium chloride prepared by reaction of phosphorous oxychloride with diethylacetamide

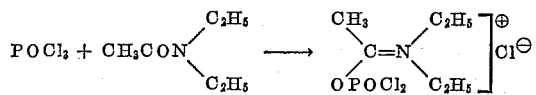

I claim:
1. The process which comprises reacting a sapogenin with a formamidinum salt having a halide anion, Y, whereby is formed a product mixture comprising a 20(22)-furostene of the following formula:

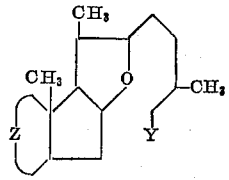

and a 22-furostene of the following formula:

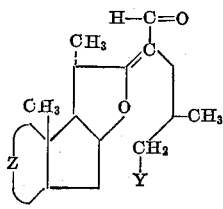

wherein Y is halogen having an atomic weight greater than 19, and Z represents the A, B, and C-rings of said sapogenin.

2. The process according to claim 1 wherein said sapogenin has a lower alkanoyloxy group at C-3 and wherein said formamidinium salt is dimethylformamido chloride whereby is obtained a product mixture comprising a 27-chloro-20(22)-furostene of the following formula:

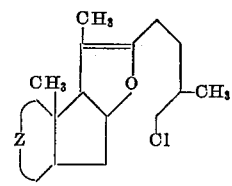

and a 23-formyl-27-chloro-22-furostene of the following formula:

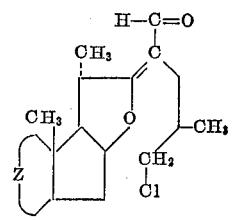

wherein Z represents the A, B, and C-rings of said sapogenin 3-lower alkanoate.

3. The process according to claim 2 wherein said sapogenin 3-lower alkanoate is diosgenin acetate whereby there is formed a product mixture comprising 3β-acetoxy-27-chloro-5,20(22)-furostadiene and 3β-acetoxy-23-formyl-27-chloro-5,22-furostadiene.

4. The process according to claim 2 wherein said sapogenin 3-lower alkanoate is hecogenin acetate whereby there is formed a product mixture comprising 3β-acetoxy-12-keto-27-chloro-5α-20(22)-furostene and 3β-acetoxy-12-keto-23-formyl-27-chloro-5α-22-furostene.

5. The process which comprises reacting a sapogenin with a formamidinium salt having a halide anion, Y; treating with base the resultant product mixture comprising a 27-Y-20(22)-furostene of the following formula:

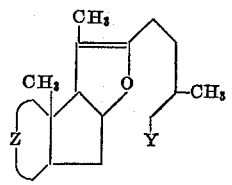

and a 27-Y-22-furostene of the following formula:

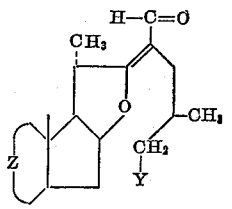

wherein Y is a halogeno having an atomic weight greater than 19, and Z represents the A, B, and C-rings of said sapogenin;
treating with chromium trioxide the resultant product mixture comprising a 27-Y'-20(22)-furostene of the following formula:

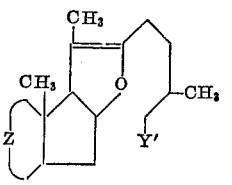

and a 16,17(4′,5′)dihydrofurano androstane of the following formula:

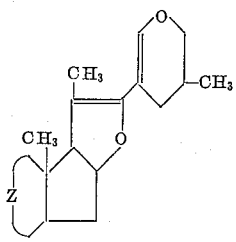

wherein Y′ is a member selected from the group consisting of halogeno having an atomic weight greater than 19, and lower alkanoyloxy, and wherein Z represents the A, B, and C-rings of said sapogenin; followed by treatment with acid or base of the resultant product mixture comprising 16β-acyloxy pregnanes of the following formulae:

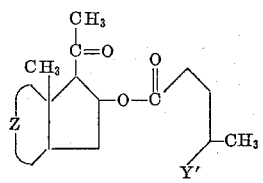

and

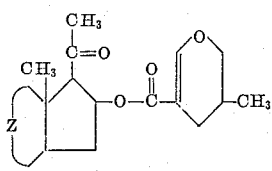

wherein Y′ is a member selected from the group consisting of halogeno having an atomic weight greater than 19, and lower alkanoyloxy, and Z represents the A, B, and C-rings of said sapogenin; whereby is formed a 16-dehydro-20-keto steroid of the pregnane series having the following structural formula:

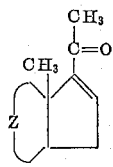

wherein Z represents the A, B, and C-rings of said sapogenin.

6. The process according to claim 5 wherein said sapogenin is diosgenin acetate, wherein said formamidinium salt is dimethylformamido chloride, and wherein the said base for treating the product mixture comprising a 27-Y-20(22)-furostene and a 27-Y-22-furostene is an alkali metal alkoxide, and wherein after said basic treatment and prior to said treatment with chromium trioxide are included the additional steps comprising adding acid to the resultant basic reaction mixture until the reaction mixture is approximately neutral and treating said neutralized reaction mixture with acetic anhydride in pyridine, said process being a method for preparing 16-dehydropregnenolone acetate which comprises reacting diosgenin acetate with dimethylformamido chloride; treating the resultant product mixture comprising 3β-acetoxy-27-chloro-5,20(22)-furostadiene and 3β-acetoxy-23-formyl-27-chloro-5,22-furostadiene with an alkali metal alkoxide; adding acid to the resultant basic reaction mixture until the reaction mixture is approximately neutral, treating with acetic anhydride in pyridine, said neutralized reaction medium comprising the aforementioned resultant product mixture and the 3-hydroxy analogs thereof, whereby is formed the 3-acetate ester of said 3-hydroxy analog; treating the resultant product mixture comprising 3β-acetoxy-27-chloro-5,20(22)-furostadiene and 3β-acetoxy-16,17(4′, 5′) - [3′ - methyl - 2′ - [3″ - (5″ - methyldihydropyranyl)]-dihydrofurano]-5-androstene with chromium trioxide in pyridine; followed by treatment with acid or base of the resultant product mixture comprising 16β-(5′-chloro - 4′ - methylvaleroxy)-pregnenolone 3-acetate and 16β-hydroxypregnenolone 3-acetate 16-(5′-methyldihydropyranyl-3′-carboxylate).

7. The process according to claim 5 wherein said sapogenin is diosgenin acetate, wherein said formamidinium salt is dimethylformamido chloride, and wherein said base for treatment of the product mixture comprising a 27-Y-20(22)-furostene and a 27-Y-22-furostene is sodium acetate in dimethylformamido, said process being a method for preparing 16-dehydropregenolone acetate which comprises reacting diosgenin acetate with dimethylformamidochloride; treating the resultant product mixture comprising 3β-acetoxy-27-chloro-5,20(22)-furostadiene and 3β - acetoxy - 23 - formyl - 27 - chloro - 5,22 - furostadiene with sodium acetate in dimethylformamide; treating the resultant product mixture comprising 3β,27-diacetoxy - 5,20(22) - furostadiene and 3β - acetoxy - 16,17(4′, 5′) - [3′ - methyl - 2′ - [3″ - (5″ - methyldihydropyranyl]-dihydrofurano]-5-androstene with chromium trioxide in pyridine; and treating with acid or base the resultant product mixture comprising 16β-(5′-acetoxy-4′-methylvaleroxy)-pregnenolone 3-acetate and 16β-hydroxypregnenolone 3-acetate 16-(5′-methyldihydropyranyl-3′-carboxylate).

8. The process which comprises reacting a sapogenin with a formamidinium salt having a halide anion other than fluoride; treating the resultant product mixture with base; in turn treating the product mixture resulting therefrom with chromium trioxide in pyridine; followed by treatment of the resultant product mixture with acid or base, whereby is formed a 16-dehydro-20-keto steroid of the pregnane series of the following formula:

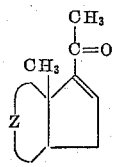

wherein Z represents the A, B, and C-rings of said sapogenin.

9. The process which comprises treating a 20(22)-furostene of the following formula:

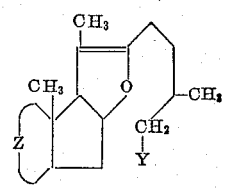

wherein Y is halogeno having an atomic weight greater than 19, and Z represents the A, B, and C-rings of a sapogenin having a 3-lower alkanoyloxy group, with a reagent of the group consisting of ozone and chromium trioxide; treating with base the thereby formed 16β-valeroxy-20-keto-pregnane of the following formula:

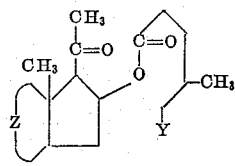

wherein Y is a halide other than fluoride and Z represents the A, B, and C-ring of a sapogenin having a 3-lower alkanoyloxy group; whereby is formed a 16-dehydro-20- keto steroid of the pregnane series having the following formula:

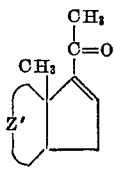

wherein Z' represents the A, B, and C-ring of a sapogenin having a 3-hydroxy group.

10. The process according to claim 9 wherein said 20 (22)-furostene is 27-chloro-5,20(22)-furostadiene, wherein said reagent is chromium trioxide, and wherein said base is an alkali metal hydroxide, said process comprising oxidizing 27-chloro-5,20(22)-furostadiene with chromium trioxide in acetic acid, treating the thereby formed 16β-(5'-chloro-4'-methylvaleroxy)-pregnenolone acetate with an alkali metal hydroxide and isolating the thereby formed 16-dehydropregnenolone.

11. The process which comprises treating with base a compound of the following formula:

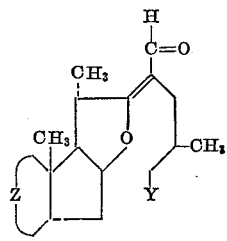

wherein Y is halogeno having an atomic weight greater than 19, and Z represents the A, B, and C-rings of a sapogenin, and treating with chromium trioxide under mildly basic conditions the thereby formed

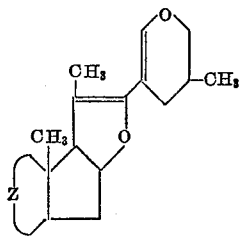

wherein Z represents the A, B, and C-rings of said sapogenin; treating with acid or base, the thereby formed

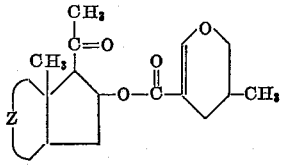

wherein Z represents the A, B, and C-ring of said sapogenin; whereby is formed a 16-dehydro-20-keto steroid of the pregnane series having the following formula:

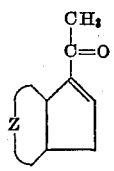

wherein Z represents the A, B, and C-ring of said sapogenin.

12. The process according to claim 11 wherein said base is tertiary butoxide in tertiary-butanol and wherein said compound is 3β-acetoxy-23-formyl-27-chloro-5,22-furostadiene, said process comprising reacting 3β-acetoxy-23-formyl-27-chloro-5,22 - furostadiene with tertiary-butoxide in the tertiary-butanol; reacetylating the thereby formed 3β-hydroxy-16,17(4',5')-[3'-methyl-2'[3'' - (5''-methyldihydropyranyl)]-dihydrofurano] - 5 - androstene and oxidizing the resulting 3β-acetoxy - 16,17(4',5')-[3'-methyl-2'-[3''-(5'' - methyldihydropyranyl)]-dihydrofurano]-5-androstene with chromium trioxide in pyridine followed by treatment with acid or base whereby is formed 16-dehydropregnenolone acetate.

13. A compound selected from the group consisting of 27-halogeno-20(22)-furostene derivatives of the following formula:

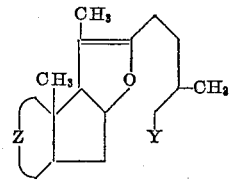

wherein Y is halogeno other than fluoro, and Z represents the A, B, and C-rings of a sapogenin having at C-3 a member selected from the group consisting of hydroxy and lower alkanoyloxy, and having at C-5 a member of the group consisting of 5α-hydrogen, a 5β-hydrogen, and an additional bond to C-6 and having at C-12 a member of the group consisting of keto, hydroxy, and lower alkanoyloxy.

14. The compound according to claim 13 wherein Y is chloro, Z represents the A, B, and C-rings of a sapogenin having at C-3 a 3β-acetoxy group, at C-5 a 5β-hydrogen, and at C-12 a keto group, said compound being 3β-acetoxy-12-keto-27-chloro-20(22)-furostene.

15. A compound selected from the group consisting of 23-formyl-27-halogeno-22-furostene derivatives of the followng formula:

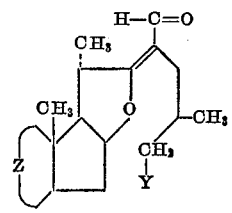

wherein Y is a halogeno other than fluoro, and Z represents the A, B, and C-rings of a steroidal sapogenin having at C-3 a member selected from the group consisting of hydroxy and lower alkanoyloxy, at C-5 a member of the group consisting of a 5α-hydrogen, a 5β-hydrogen, and an additional bond to C-6; and at C-12, a member of the group consisting of hydrogen, keto, hydroxy and lower alkanoyloxy.

16. The compound according to claim 15 wherein Y is chloro, and Z represents the A, B, and C-rings of a steroidal sapogenin having at C-3 a 3β-acetoxy group, at C-5 an additional bond to C-6, and at C-12 a hydrogen, said compound being 3β-acetoxy-23-formyl-27-chloro-5, 22-furostadiene.

17. The compound according to claim 15 wherein Y is chloro and wherein Z represents the A, B, and C-rings of a steroidal sapogenin having at C-3 a 3β-acetoxy group at C-5 a 5α-hydrogen, and at C-12 a keto group, said compound being 3β-acetoxy-12-keto-23-formyl-27 - chloro-5α-22-furostene.

18. The compound according to claim 16 wherein Y is chloro and wherein Z represents the A, B, and C-rings of a steroidal sapogenin and having at C-3 a β-hydroxy group, at C-5 a 5α-hydrogen, and at C-12 a keto group, said compound being 3β-hydroxy-12-keto-23-formyl-27-chloro-5α-22-furostene.

19. A compound selected from the group consisting of 16,17(4',5')-dihydrofurano androstanes of the following structural formula:

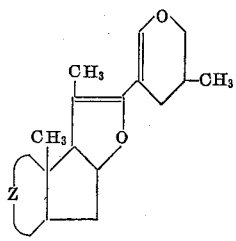

wherein Z represents the A, B, and C-rings of a sapogenin having at C-3 a member selected from the group consisting of hydroxy and lower alkanoyloxy, at C-5 a member of the group consisting of a 5α-hydrogen, a 5β-hydrogen and an additional bond to C-6, and at C-12 a member selected from the group consisting of hydrogen, keto, hydroxy, and lower alkanoyloxy.

20. The compound according to claim 19 wherein Z represents the A, B, and C-rings of a sapogenin having at C-3 a β-hydroxy group, at C-5 an additional bond to C-6, and at C-12 a hydrogen, said compound being 3β-hydroxy-16,17(4',5')-[3-methyl-2'-[3''-(5'' - methyldihydropyranyl)]-dihydrofurano]-5-androstene.

21. The compound according to claim 19 wherein Z represents the A, B, and C-rings of a sapogenin having at C-3 a β-acetoxy group, at C-5 an additional bond to C-6, and at C-12 a hydrogen, said compound being 3β-acetoxy-16,17(4',5')-[3'-methyl-2'-[3''-(5'' - methyldihydropyranyl)]-dihydrofurano]-5-androstene.

22. A compound selected from the group consisting of 16β-valeroxy-20-keto steroids of the pregnane series of the following formula:

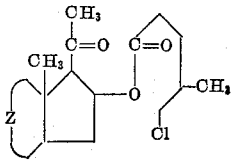

wherein Z represents the A, B, and C-rings of a steroidal sapogenin having at C-3 a lower alkanoyloxy group; at C-5 a member of the group consisting of a 5α-hydrogen, a 5β-hydrogen, and an addiitonal bond to C-6; and at C-12 a member selected from the group consisting of hydrogen, keto, and lower alkanoyloxy.

23. The compound according to claim 22 wherein Z represents the A, B, and C-rings of a steroidal sapogenin having at C-3 a β-acetoxy group, at C-5 an additional bond to C-6, and at C-12 a hydrogen, said compound being 3β-acetoxy-16β-(5'-chloro-4'-methyl-valeroxy) - 5-pregnene-3β-ol-20-one.

24. A compound selected from the group consisting of 16β-dihydropyranyl carboxy pregnanes of the following formula:

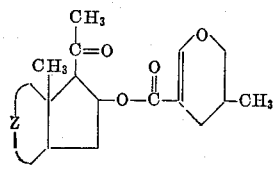

wherein Z represents the A, B, and C-rings of a steroidal sapogenin having at C-3 a lower alkanoyloxy group; at C-5 a member of the group consisting of a 5α-hydrogen, a 5β-hydrogen, and an additional bond to C-6; and at C-12 a member selected from the group consisting of hydrogen, keto, and lower alkanoyloxy.

25. The compound according to claim 24 wherein Z represents the A, B, and C-rings of a steroidal sapogenin having at C-3 a β-acetoxy group, at C-5 an additional bond to C-6, and at C-12 a hydrogen, said compound being 16β-hydroxy-pregnenolone 3-acetate 16-(5'-methyl-tetrahydropyranyl-3'-carboxylate).

No references cited.

LEWIS GOTTS, *Primary Examiner.*

ELBERT ROBERTS, *Examiner.*